(12) United States Patent
Takematsu et al.

(10) Patent No.: US 12,556,213 B2
(45) Date of Patent: *Feb. 17, 2026

(54) RADIO FREQUENCY MODULE AND COMMUNICATION DEVICE

(71) Applicant: Murata Manufacturing Co., Ltd., Kyoto (JP)

(72) Inventors: Yuji Takematsu, Kyoto (JP); Takanori Uejima, Kyoto (JP); Dai Nakagawa, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 341 days.

This patent is subject to a terminal disclaimer.

(21) Appl. No.: 18/309,050

(22) Filed: Apr. 28, 2023

(65) Prior Publication Data

US 2023/0268950 A1 Aug. 24, 2023

Related U.S. Application Data

(63) Continuation of application No. PCT/JP2021/032638, filed on Sep. 6, 2021.

(30) Foreign Application Priority Data

Dec. 7, 2020 (JP) ................................. 2020-202608

(51) Int. Cl.
*H04B 1/04* (2006.01)
*H04B 1/18* (2006.01)
*H04B 1/38* (2015.01)

(52) U.S. Cl.
CPC .............. *H04B 1/38* (2013.01); *H04B 1/0483* (2013.01); *H04B 1/18* (2013.01)

(58) Field of Classification Search
CPC ......... H05K 1/0243; H05K 2201/1006; H05K 2201/10098; H05K 2201/10507;
(Continued)

(56) References Cited

U.S. PATENT DOCUMENTS 10,026,701 B1 * 7/2018 Rodenbeck ......... H01L 23/3135
2016/0172532 A1 * 6/2016 Rhee .................... H10H 20/825
438/42

(Continued)

FOREIGN PATENT DOCUMENTS

JP 2018-195756 A 12/2018
JP 2019-149466 A 9/2019

(Continued)

OTHER PUBLICATIONS

International Search Report for PCT/JP2021/032638 dated Nov. 30, 2021.

*Primary Examiner* — Davetta W Goins
(74) *Attorney, Agent, or Firm* — McDonald Hopkins LLC (57) ABSTRACT

A radio frequency module includes a module substrate having a principal surface, one or more circuit components disposed on a principal surface side, a resin member disposed on the principal surface side and covering a side surface of the one or more circuit components, a metal shield layer in contact with a top surface of the resin member and a top surface of the one or more circuit components, and an engraved portion provided on the top surface of the one or more circuit components.

20 Claims, 5 Drawing Sheets

(58) Field of Classification Search
CPC .......... H04B 1/38; H04B 1/0483; H04B 1/18; H01L 23/00; H01L 23/28; H01L 23/29; H01L 25/00
See application file for complete search history.

(56) References Cited

U.S. PATENT DOCUMENTS

| | | |
|---|---|---|
| 2019/0269046 A1 | 8/2019 | Takizawa et al. |
| 2020/0058599 A1 | 2/2020 | Okada et al. |
| 2020/0245465 A1* | 7/2020 | Zhang .................... H05K 1/183 |
| 2021/0375797 A1* | 12/2021 | Cotronakis ............. H01L 24/49 |
| 2022/0189838 A1 | 6/2022 | Okabe |

FOREIGN PATENT DOCUMENTS

| | | |
|---|---|---|
| WO | 2014/013831 A1 | 1/2014 |
| WO | 2018/198856 A1 | 11/2018 |
| WO | 2021/049400 A1 | 3/2021 |

* cited by examiner

RADIO FREQUENCY MODULE AND COMMUNICATION DEVICE

CROSS REFERENCE TO RELATED APPLICATION

This is a continuation of International Application No. PCT/JP2021/032638 filed on Sep. 6, 2021 which claims priority from Japanese Patent Application No. 2020-202608 filed on Dec. 7, 2020. The contents of these applications are incorporated herein by reference in their entireties.

BACKGROUND OF THE DISCLOSURE

Field of the Disclosure

The present disclosure relates to a radio frequency module and a communication device.

Description of the Related Art

Patent Document 1 discloses a module including a module substrate, electronic components mounted on a mounting surface of the module substrate, and a resin layer covering side surfaces of the electronic components. The upper surfaces of the electronic components are in contact with a metal film, and the heat generated in the electronic components is dissipated through the metal film.

Patent Document 1: International Publication No. 2014/013831

BRIEF SUMMARY OF THE DISCLOSURE

Further improvement of heat dissipation is required for radio frequency modules.

The present disclosure provides a radio frequency module and a communication device with excellent heat dissipation.

A radio frequency module according to one aspect of the present disclosure includes a module substrate having a principal surface, one or more circuit components disposed on a principal surface side, a resin member disposed on the principal surface side and covering a side surface of the one or more circuit components, a metal layer in contact with a top surface of the resin member and a top surface of the one or more circuit components, and an engraved portion provided on the top surface of the one or more circuit components.

A communication device according to another aspect of the present disclosure includes an RF signal processing circuit configured to process radio frequency signals transmitted and received by an antenna, and the radio frequency module according to the one aspect configured to transmit the radio frequency signals between the antenna and the RF signal processing circuit.

According to the present disclosure, a radio frequency module and a communication device with excellent heat dissipation can be provided.

DETAILED DESCRIPTION OF THE DISCLOSURE

Hereinafter, a radio frequency module and a communication device according to Embodiment of the present disclosure will be described in detail with reference to the drawings. Note that each of the embodiments described below is a specific example of the present disclosure. Thus, numerical values, shapes, materials, constituent elements, arrangement and connection of the constituent elements, steps, sequence of the steps, and the like illustrated in the following embodiments are examples, and are not intended to limit the present disclosure. Therefore, among the constituent elements in the following embodiments, constituent elements not described in independent claims are described as optional constituent elements.

In addition, the drawings are schematic diagrams and are not necessarily strictly illustrated. Thus, for example, scales and the like do not necessarily match in the drawings. In the drawings, substantially the same components are denoted by the same reference numerals, and redundant descriptions thereof will be omitted or simplified.

In this specification, terms indicating relationships between elements such as parallel or orthogonal, terms indicating shapes of elements such as rectangles, and numerical ranges are not expressions representing only strict meanings, but expressions representing substantially equivalent ranges, for example, expressions including differences of several percent.

In this specification, the terms "upper" and "lower" do not refer to an upward direction (vertically upward) and a downward direction (vertically downward) in absolute spatial recognition, but are used as terms defined by relative positional relationships based on a layering order in a layered configuration. Thus, for example, an "upper surface" of a component or a member can be any of surfaces in various directions in actual use, including not only a vertically upper surface but also a vertically lower surface and a surface perpendicular to a horizontal direction.

In this specification and the drawings, an x-axis, a y-axis, and a z-axis represent three axes of a three-dimensional Cartesian coordinate system. When the module substrate is a rectangle when viewed in plan, the x-axis and the y-axis are directions parallel to a first side of the rectangle and a second side orthogonal to the first side, respectively. The z-axis is a thickness direction of the module substrate. In this specification, the "thickness direction" of the module substrate refers to a direction perpendicular to a principal surface of the module substrate.

In this specification, "connected" includes not only when directly connected by a connection terminal and/or a wiring conductor, but also when electrically connected via another circuit element. In addition, "connected between A and B" means connected to both A and B between A and B.

In a component arrangement in the present disclosure, "the module substrate is viewed in plan" means that an object is orthographically projected onto an xy plane from a positive side of the z-axis. "The component is disposed at the substrate" includes "the component is disposed on the substrate in contact with the substrate" as well as "the component is disposed above the substrate without being in contact with the substrate (e.g., the component is layered on top of another component disposed on the substrate)" and "the component is partially embedded in the substrate". "The component is disposed on a principal surface side of the substrate" includes "the component is disposed on the principal surface of the substrate in contact with the principal surface" as well as "the component is disposed above the principal surface without being in contact with the principal surface" and "the component is partially embedded in the substrate from the principal surface side".

In this specification, ordinal numbers such as "first" and "second" do not mean the number or order of constituent elements unless otherwise specified, and are used to distinguish between constituent elements of the same type so that they are not confused.

Embodiment

1. Circuit Configurations of Radio Frequency Module and Communication Device

Figure 1:
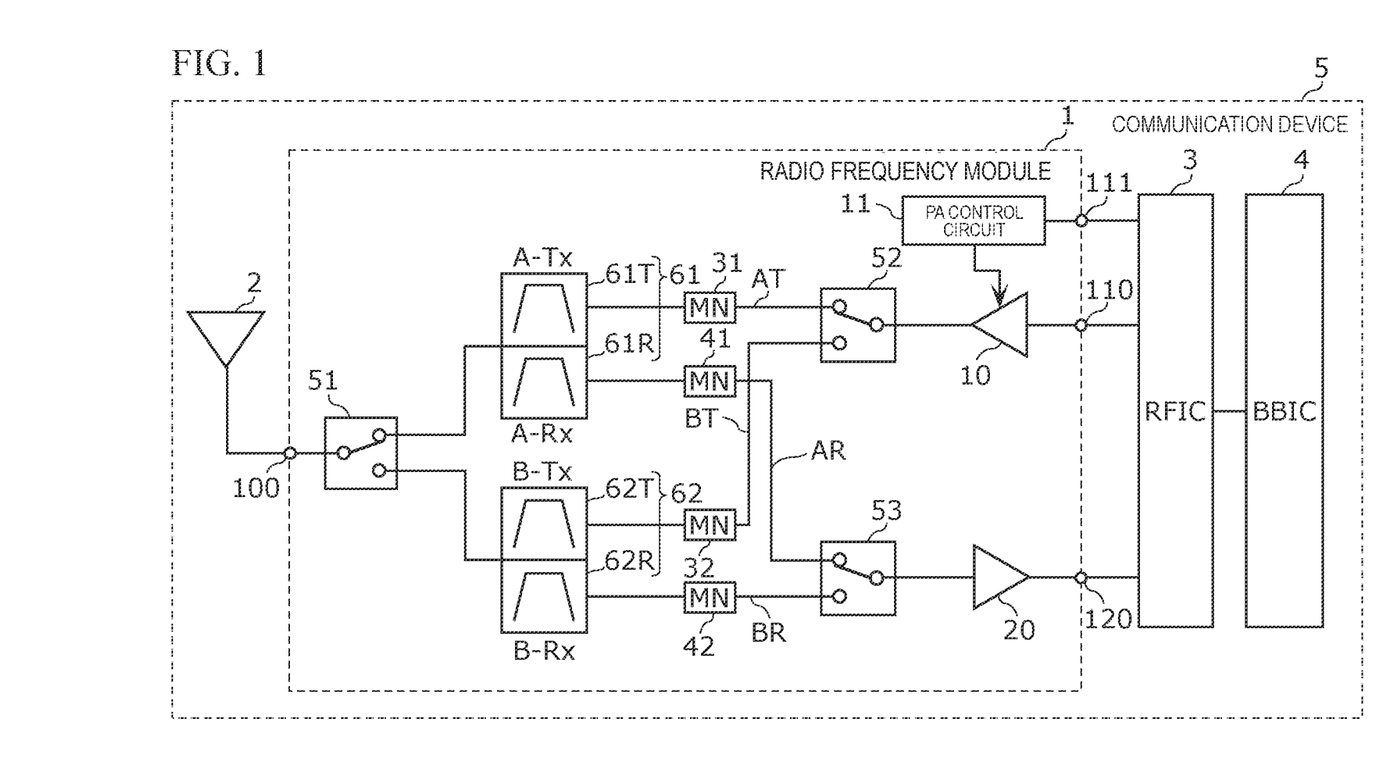
FIG. 1 is a circuit diagram of a radio frequency module and a communication device according to Embodiment.

First, circuit configurations of the radio frequency module and the communication device according to Embodiment will be described with reference to FIG. 1. FIG. 1 is a circuit diagram of a radio frequency module 1 and a communication device 5 according to Embodiment.

1-1. Circuit Configuration of Communication Device

The communication device 5 is a device used in a communication system and is, for example, a mobile terminal such as a smartphone or a tablet computer. As illustrated in FIG. 1, the communication device 5 includes the radio frequency module 1, an antenna 2, an RF signal processing circuit (RFIC) 3, and a baseband signal processing circuit (BBIC) 4.

The radio frequency module 1 transmits radio frequency signals between the antenna 2 and the RFIC 3. An internal configuration of the radio frequency module 1 will be described later.

The antenna 2 is connected to an antenna connection terminal 100 of the radio frequency module 1, transmits a radio frequency signal (transmitting signal) outputted from the radio frequency module 1, and also receives a radio frequency signal (receiving signal) from the outside and outputs the radio frequency signal to the radio frequency module 1.

The RFIC 3 is an example of a signal processing circuit that processes radio frequency signals transmitted and received by the antenna 2. To be specific, the RFIC 3 processes a radio frequency receiving signal inputted via a receive path of the radio frequency module 1 by down-conversion or the like, and outputs a receiving signal generated by the signal processing to the BBIC 4. In addition, the RFIC 3 processes a transmitting signal inputted from the BBIC 4 by up-conversion or the like, and outputs a radio frequency transmitting signal generated by the signal processing to a transmit path of the radio frequency module 1.

Further, the RFIC 3 includes a control section that controls switches, amplifiers, and the like of the radio frequency module 1. Note that some or all of the functions of the RFIC 3 as the control section may be implemented outside the RFIC 3, for example, in the BBIC 4 or the radio frequency module 1.

The BBIC 4 is a baseband signal processing circuit that processes signals using an intermediate frequency band for frequencies lower than the frequency of the radio frequency signals transmitted by the radio frequency module 1. Signals processed by the BBIC 4 are, for example, image signals for displaying images and/or audio signals for calling through a speaker.

In the communication device 5 according to the present embodiment, the antenna 2 and the BBIC 4 are not essential constituent elements.

1-2. Circuit Configuration of Radio Frequency Module

Next, a circuit configuration of the radio frequency module 1 will be described. As illustrated in FIG. 1, the radio frequency module 1 includes a power amplifier 10, a PA control circuit 11, a low noise amplifier 20, matching circuits 31, 32, 41, and 42, switches 51 to 53, and duplexers 61 and 62. The radio frequency module 1 also includes the antenna connection terminal 100, a control input terminal 111, a radio frequency input terminal 110, and a radio frequency output terminal 120.

The antenna connection terminal 100 is connected to the antenna 2.

The control input terminal 111 is a terminal for receiving a digital signal for controlling a gain of the power amplifier 10 and a power supply voltage and a bias voltage supplied to the power amplifier 10. For example, the control input terminal 111 is a terminal compatible with a mobile industry processor interface (MIPI) and receives a digital signal from the RFIC 3.

The radio frequency input terminal 110 is a terminal for receiving a radio frequency transmitting signal from the outside of the radio frequency module 1. In the present embodiment, the radio frequency input terminal 110 is a terminal for receiving transmitting signals in communication bands A and B from the RFIC 3.

The radio frequency output terminal 120 is a terminal for providing radio frequency receiving signals to the outside of the radio frequency module 1. In the present embodiment, the radio frequency output terminal 120 is a terminal for providing receiving signals in the communication bands A and B to the RFIC 3.

The communication band means a frequency band predefined by, for example, a standardization organization (e.g., 3rd Generation Partnership Project (3GPP) and Institute of Electrical and Electronics Engineers (IEEE)) for a communication system. Here, the communication system means a communication system constructed by using a radio access technology (RAT). As the communication system, for example, a 5th Generation New Radio (5G NR) system, a Long Term Evolution (LTE) system, and a Wireless Local Area Network (WLAN) system can be used, but the communication system is not limited thereto.

The communication bands A and B are communication bands different from each other. In the present embodiment, communication bands for Frequency Division Duplex (FDD) are used as communication bands A and B. As at least one of the communication bands A and B, a communication band for Time Division Duplex (TDD) may be used.

The power amplifier 10 can amplify transmitting signals in the communication bands A and B. Here, an input terminal of the power amplifier 10 is connected to the radio frequency input terminal 110, and an output terminal of the power amplifier 10 is connected to the switch 52.

The configuration of the power amplifier 10 is not limited to a specific configuration. For example, the power amplifier 10 may have a single-stage configuration or a multi-stage configuration. For example, the power amplifier 10 may include multiple cascade-connected amplifying elements. The power amplifier 10 may convert a radio frequency signal into balanced signals and amplify the balanced signals. Such a power amplifier 10 is sometimes referred to as a differential amplifier. "Balanced signals" means a pair of signals having phases opposite to each other. "Balanced signals" is sometimes referred to as differential signals.

The PA control circuit 11 is an example of a control circuit that controls the power amplifier 10. The PA control circuit 11 controls the gain of the power amplifier 10 based on the digital signal inputted via the control input terminal 111.

The PA control circuit 11 is, for example, one semiconductor integrated circuit. The semiconductor integrated circuit is configured using a complementary metal oxide semiconductor (CMOS), for example, and is specifically fabricated using a silicon on insulator (SOI) process. Thus, the semiconductor integrated circuit can be manufactured at low costs. At least one of GaAs, SiGe, and GaN may be used as a material for the semiconductor integrated circuit.

The low noise amplifier 20 can amplify receiving signals in the communication bands A and B received by the antenna connection terminal 100. Here, an input terminal of the low noise amplifier 20 is connected to the switch 53, and an output terminal of the low noise amplifier 20 is connected to the radio frequency output terminal 120.

The configuration of the low noise amplifier 20 is not limited to a specific configuration. For example, the low noise amplifier 20 may have a single-stage configuration or a multi-stage configuration.

Each of the power amplifier 10 and the low noise amplifier 20 is configured using, for example, a Si-based CMOS or a GaAs field-effect transistor (FET) or a GaAs heterojunction bipolar transistor (HBT).

The duplexer 61 is an example of a filter having a pass band including the communication band A. The duplexer 61 passes radio frequency signals in the communication band A. The duplexer 61 transmits a transmitting signal and a receiving signal in the communication band A by the FDD system. The duplexer 61 includes the transmit filter 61T and the receive filter 61R.

The transmit filter 61T has a pass band that includes an uplink operating band in the communication band A. One end of the transmit filter 61T is connected to the antenna connection terminal 100 via the switch 51. The other end of the transmit filter 61T is connected to the output terminal of the power amplifier 10 via the matching circuit 31 and the switch 52.

The "uplink operating band" refers to part of a communication band designated for an uplink. For the radio frequency module 1, the uplink operating band means a transmission band.

The receive filter 61R has a pass band that includes a downlink operating band in the communication band A. One end of the receive filter 61R is connected to the antenna connection terminal 100 via the switch 51. The other end of the receive filter 61R is connected to the input terminal of the low noise amplifier 20 via the matching circuit 41 and the switch 53.

The "downlink operating band" refers to part of a communication band designated for a downlink. For the radio frequency module 1, the downlink operating band means a reception band.

The duplexer 62 is an example of a filter having a pass band including the communication band B. The duplexer 62 passes radio frequency signals in the communication band B. The duplexer 62 transmits a transmitting signal and a receiving signal in the communication band B by the FDD system. The duplexer 62 includes the transmit filter 62T and the receive filter 62R.

The transmit filter 62T has a pass band that includes an uplink operating band in the communication band B. One end of the transmit filter 62T is connected to the antenna connection terminal 100 via the switch 51. The other end of the transmit filter 62T is connected to the output terminal of the power amplifier 10 via the matching circuit 32 and the switch 52.

The receive filter 62R has a pass band that includes a downlink operating band in the communication band B. One end of the receive filter 62R is connected to the antenna connection terminal 100 via the switch 51. The other end of the receive filter 62R is connected to the input terminal of the low noise amplifier 20 via the matching circuit 42 and the switch 53.

Each of the transmit filters 61T and 62T and the receive filters 61R and 62R is, for example, any one of an acoustic wave filter using surface acoustic waves (SAW), an acoustic wave filter using bulk acoustic waves (BAW), an LC resonance filter, and a dielectric filter, but is not limited thereto.

The switch 51 is connected between the antenna connection terminal 100 and each of the duplexers 61 and 62. The switch 51 is also referred to as an antenna switch. For example, based on the control signal from the RFIC 3, the switch 51 switches between (a) the connection between the antenna connection terminal 100 and both the transmit filter 61T and the receive filter 61R and (b) the connection between the antenna connection terminal 100 and both the transmit filter 62T and the receive filter 62R. The switch 51 is, for example, a single-pole double-throw (SPDT) switch circuit. Note that the switch 51 may be a multi-connection switch circuit capable of simultaneously performing the connections (a) and (b).

The switch 52 is connected between each of the duplexers 61 and 62 and the power amplifier 10. For example, based on the control signal from the RFIC 3, the switch 52 switches between the connection between the power amplifier 10 and the transmit filter 61T and the connection between the power amplifier 10 and the transmit filter 62T. The switch 52 is, for example, an SPDT switch circuit.

The switch 53 is connected between each of the duplexers 61 and 62 and the low noise amplifier 20. For example, based on the control signal from the RFIC 3, the switch 53 switches between the connection between the low noise amplifier 20 and the receive filter 61R and the connection between the low noise amplifier 20 and the receive filter 62R. The switch 53 is, for example, an SPDT switch circuit.

The matching circuit 31 is connected between the transmit filter 61T and the output terminal of the power amplifier 10. To be specific, the matching circuit 31 is connected to the power amplifier 10 via the switch 52. The matching circuit 31 matches the impedance between the transmit filter 61T and the power amplifier 10.

The matching circuit 32 is connected between the transmit filter 62T and the output terminal of the power amplifier 10. To be specific, the matching circuit 32 is connected to the power amplifier 10 via the switch 52. The matching circuit 32 matches the impedance between the transmit filter 62T and the power amplifier 10.

The matching circuit 41 is connected between the receive filter 61R and the input terminal of the low noise amplifier 20. To be specific, the matching circuit 41 is connected to the low noise amplifier 20 via the switch 53. The matching circuit 41 matches the impedance between the receive filter 61R and the low noise amplifier 20.

The matching circuit 42 is connected between the receive filter 62R and the input terminal of the low noise amplifier 20. To be specific, the matching circuit 42 is connected to the low noise amplifier 20 via the switch 53. The matching circuit 42 matches the impedance between the receive filter 62R and the low noise amplifier 20.

Each of the matching circuits 31, 32, 41, and 42 is formed using at least one of an inductor, a capacitor, and a resistor. For example, each of the matching circuits 31, 32, 41, and 42 includes a chip inductor.

In place of or in addition to the matching circuits 31 and 32, a matching circuit may be provided between the switch 52 and the output terminal of the power amplifier 10. In place of or in addition to the matching circuits 41 and 42, a matching circuit may be provided between the switch 53 and the input terminal of the low noise amplifier 20. A matching circuit may be provided between the switch 51 and the duplexer 61 or 62.

In the radio frequency module 1 having the above circuit configuration, the power amplifier 10, the switch 52, the matching circuit 31, and the transmit filter 61T constitute a first transmission circuit that outputs a transmitting signal in the communication band A to the antenna connection terminal 100. The power amplifier 10, the switch 52, the matching circuit 32, and the transmit filter 62T constitute a second transmission circuit that outputs a transmitting signal in the communication band B to the antenna connection terminal 100.

The low noise amplifier 20, the switch 53, the matching circuit 41, and the receive filter 61R constitute a first reception circuit that receives a receiving signal in the communication band A from the antenna 2 via the antenna connection terminal 100. The low noise amplifier 20, the switch 53, the matching circuit 42, and the receive filter 62R constitute a second reception circuit that receives a receiving signal in the communication band B from the antenna 2 via the antenna connection terminal 100.

According to the above circuit configuration, the radio frequency module 1 according to the present embodiment can perform at least one of (1) transmission and reception of radio frequency signals in the communication band A, (2) transmission and reception of radio frequency signals in the communication band B, and (3) simultaneous transmission, simultaneous reception, or simultaneous transmission and reception of radio frequency signals in the communication band A and radio frequency signals in the communication band B.

In the radio frequency module 1 according to the present embodiment, the transmission circuit and the reception circuit do not necessarily have to be connected to the antenna connection terminal 100 via the switch 51, and the transmission circuit and the reception circuit may be connected to the antenna 2 via different terminals.

Some of the circuit elements illustrated in FIG. 1 do not necessarily have to be included in the radio frequency module 1. For example, the radio frequency module 1 may include only transmission circuits that transmit the transmitting signals. In this case, the radio frequency module 1 does not have to include the low noise amplifier 20, the matching circuits 41 and 42, the switch 53, and the receive filters 61R and 62R. The radio frequency module 1 may include only reception circuits that transmit the receiving signals. In this case, the radio frequency module 1 does not have to include the power amplifier 10, the matching circuits 31 and 32, the switch 52, and the transmit filters 61T and 62T. The radio frequency module 1 may transmit radio frequency signals in only one communication band. In this case, the radio frequency module 1 does not have to include the switch 51, the matching circuits 32 and 42, and the duplexer 62.

2. Component Arrangement in Radio Frequency Module

Next, an example of component arrangement in the radio frequency module 1 will be described with reference to FIGS. 2A, 2B, and 3.

Figure 2A:
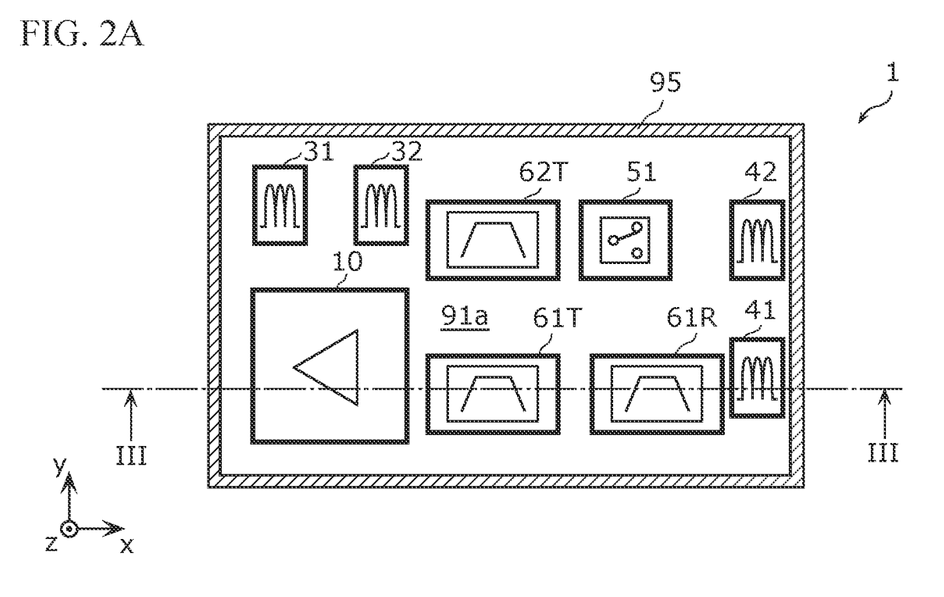
FIG. 2A is a plan view illustrating a component arrangement in the radio frequency module according to Embodiment.
Figure 2B:
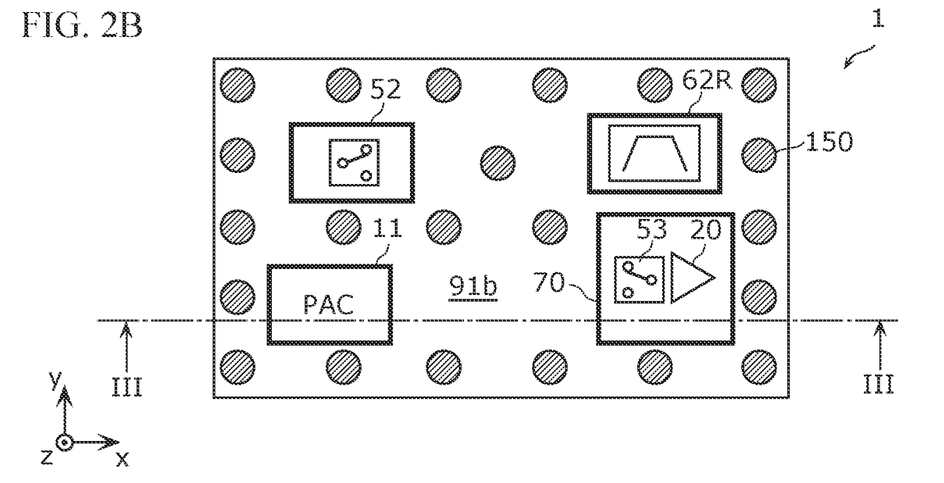
FIG. 2B is a plan view illustrating a component arrangement in the radio frequency module according to Embodiment.

FIGS. 2A and 2B are plan views illustrating component arrangements in the radio frequency module 1 according to the present embodiment. FIG. 2A illustrates the arrangement of components and members disposed on a principal surface 91a side when the principal surface 91a of the module substrate 91 is viewed from the positive side of the z-axis. FIG. 2B illustrates the arrangement of components and members disposed on a principal surface 91b side when the principal surface 91b of the module substrate 91 is viewed from the positive side of the z-axis. Since the principal surface 91b faces a negative side of the z-axis, FIG. 2B is a plan view of the components and members disposed on the principal surface 91b side of the module substrate 91 as seen through the module substrate 91.

Figure 3:
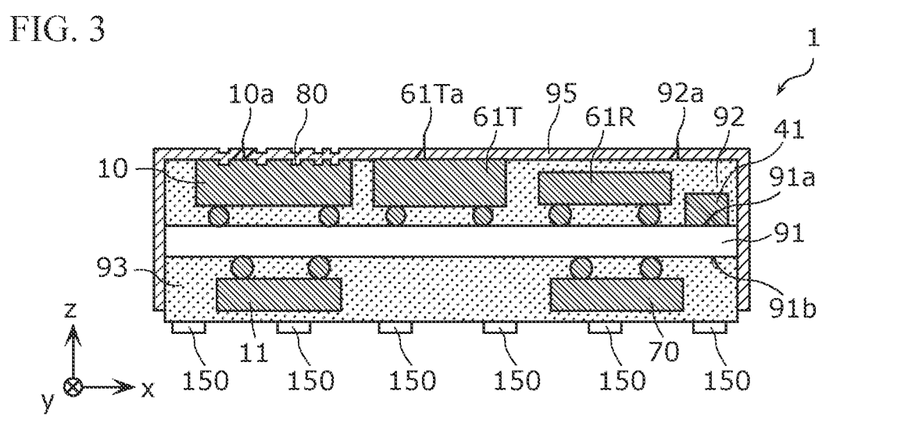
FIG. 3 is a sectional view of the radio frequency module according to Embodiment.

FIG. 3 is a sectional view of the radio frequency module 1 according to the present embodiment. FIG. 3 illustrates a cross section taken along line III-III in FIGS. 2A and 2B. In FIG. 3, a cross section of the module substrate 91 is not hatched for the sake of clarity.

As illustrated in FIGS. 2A, 2B, and 3, the radio frequency module 1 includes, in addition to the circuit configuration illustrated in FIG. 1, an engraved portion 80 (see FIG. 4), the module substrate 91, resin members 92 and 93, a metal shield layer 95, and external connection terminals 150.

The module substrate 91 has the principal surface 91a and the principal surface 91b opposite to the principal surface 91a. Although the module substrate 91 has a rectangular shape when viewed in plan, the shape of the module substrate 91 is not limited thereto. As the module substrate 91, for example, a low temperature co-fired ceramics (LTCC) substrate, a high temperature co-fired ceramics (HTCC) substrate, a component-embedded substrate, a substrate having a redistribution layer (RDL), a printed substrate, or the like can be used, the above-described substrates having a layered structure of a plurality of dielectric layers, but the module substrate 91 is not limited thereto.

The principal surface 91a may be referred to as an upper surface or a front surface. One or more circuit components are disposed on the principal surface 91a side. The one or more circuit components are each surface mount devices (SMDs). To be specific, the circuit component is an integrated circuit (IC), an integrated passive device (IPD), a discrete passive component such as a chip inductor or a chip capacitor, or the like. In the present embodiment, as illustrated in FIG. 2A, the circuit components disposed on the principal surface 91a side are the power amplifier 10, the matching circuits 31, 32, 41, and 42, the switch 51, the transmit filters 61T and 62T, and the receive filter 61R. The matching circuits 31, 32, 41, and 42 are chip inductors, for example.

The principal surface 91b may be referred to as a lower surface or a rear surface. One or more circuit components are disposed on the principal surface 91b side. In the present embodiment, as illustrated in FIG. 2B, the circuit components disposed on the principal surface 91b side are the PA control circuit 11, the switch 52, the receive filter 62R, and a semiconductor integrated circuit 70 including the low noise amplifier 20 and the switch 53. The plurality of external connection terminals 150 is also disposed on the principal surface 91b side.

The semiconductor integrated circuit 70 is an electronic component having electronic circuits formed on a surface and inside of a semiconductor chip (also referred to as a die). In the example illustrated in FIG. 2B, the semiconductor integrated circuit 70 includes the low noise amplifier 20 and the switch 53. The semiconductor integrated circuit 70 may be constituted using a CMOS, for example, and may be specifically fabricated using an SOI process. Thus, the semiconductor integrated circuit 70 can be manufactured at low costs. At least one of GaAs, SiGe, and GaN may be used as a material for the semiconductor integrated circuit 70. Thus, the semiconductor integrated circuit 70 having high quality can be obtained.

The external connection terminals 150 include the antenna connection terminal 100, the control input terminal 111, the radio frequency input terminal 110, and the radio frequency output terminal 120 illustrated in FIG. 1. The external connection terminals 150 also include ground terminals. Each of the external connection terminals 150 is connected to, for example, an input/output terminal and/or a ground terminal on a motherboard placed on the negative side of the z-axis of the radio frequency module 1. Each of the external connection terminals 150 is a post electrode passing through the resin member 93 covering the principal surface 91b.

The resin member 92 is placed on the principal surface 91a of the module substrate 91 and covers the principal surface 91a and side surfaces of the one or more circuit components disposed on the principal surface 91a side. In the present embodiment, the resin member 92 further covers a top surface of one or more circuit components among the plurality of circuit components disposed on the principal surface 91a side. To be specific, the resin member 92 covers top surfaces of the matching circuits 31, 32, 41, and 42, the switch 51, and the receive filter 61R. Top surfaces of the power amplifier 10 and the transmit filters 61T and 62T are exposed without being covered with the resin member 92. Note that "cover a surface" means to cover at least part of the surface, and means not only "cover the entire surface" but also "cover only part of the surface".

Note that the "top surface" corresponds to a principal surface opposite to a principal surface on the module substrate 91 side of a plurality of principal surfaces of each of the circuit components. For example, the top surfaces of the circuit components disposed on the principal surface 91a side correspond to the upper surfaces (principal surfaces on the positive side of the z-axis) of these circuit components. The same applies to a top surface of the resin member 92.

The resin member 93 is placed on the principal surface 91b of the module substrate 91 and covers the principal surface 91b and side surfaces of the one or more circuit components disposed on the principal surface 91b side. To be specific, the resin member 92 covers side surfaces and top surfaces (lower surfaces) of the circuit components each disposed on the principal surface 91b side. At least one of the plurality of circuit components disposed on the principal surface 91b side does not necessarily have to be covered with the resin member 93.

The metal shield layer 95 is in contact with a top surface 92a of the resin member 92 and a top surface of one or more circuit components disposed on the principal surface 91a side. To be specific, as illustrated in FIG. 3, the metal shield layer 95 is in contact with a top surface 10a of the power amplifier 10, a top surface 61Ta of the transmit filter 61T, and a top surface 62Ta of the transmit filter 62T (see FIG. 4). In the present embodiment, the metal shield layer 95 is in contact with and covers the top surface 92a of the resin member 92, the top surface 10a of the power amplifier 10, the top surface 61Ta of the transmit filter 61T, the top surface 62Ta of the transmit filter 62T, and side surfaces of the resin member 92, the module substrate 91, and the resin member 93.

The metal shield layer 95 is, for example, a metal thin film formed by sputtering. For example, on the side surface of the module substrate 91, the metal shield layer 95 is electrically connected to a ground electrode pattern provided on the principal surface 91a, inside, or on the principal surface 91b of the module substrate 91. With this configuration, the metal shield layer 95 is set to ground potential, thereby reducing intrusion of external noise into the circuit components included in the radio frequency module 1.

In the radio frequency module 1, for example, after disposing the circuit components on the principal surface 91a side of the module substrate 91, the circuit components and the entire principal surface 91a are molded using a liquid resin. At this time, the top surfaces of the circuit components (to be specific, the power amplifier 10 and the transmit filters 61T and 62T) whose top surfaces are exposed may also be covered with the liquid resin. After curing the liquid resin, the cured resin is polished. At this time, parts of the power amplifier 10 and the transmit filters 61T and 62T may also be polished simultaneously. This allows the top surface 10a of the power amplifier 10, the top surface 61Ta of the transmit filter 61T, and the top surface 62Ta of the transmit filter 62T to be flush with the top surface 92a of the resin member 92.

Thereafter, the engraved portion 80 is formed on the top surface 10a of the power amplifier 10, and then a metal film is formed by sputtering so as to cover the top surface 10a of the power amplifier 10, the top surface 61Ta of the transmit filter 61T, the top surface 62Ta of the transmit filter 62T, and the top surface 92a and the side surfaces of the resin member 92. Thus, the metal shield layer 95 is formed.

3. Engraved Portion

Next, the engraved portion 80 included in the radio frequency module 1 will be described with reference to FIG. 4.

Figure 4:
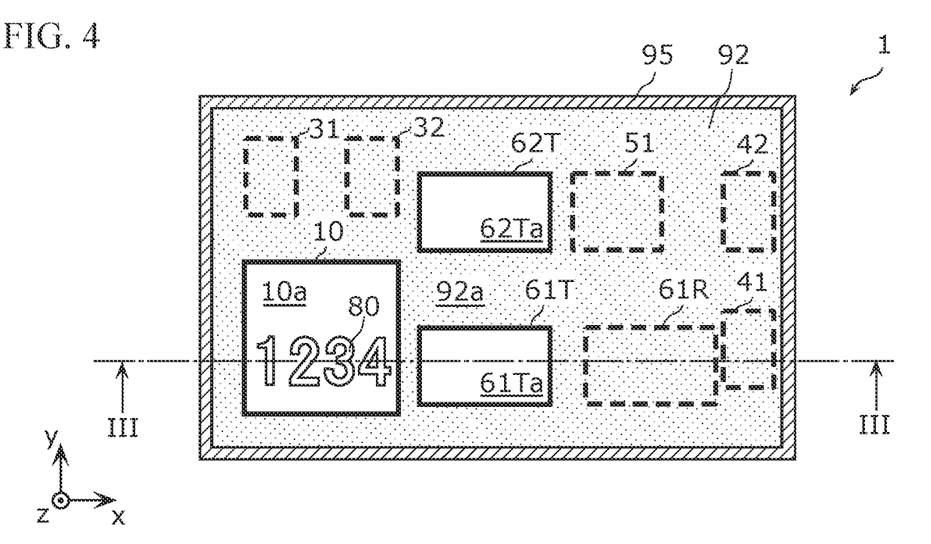
FIG. 4 is a plan view illustrating an arrangement of an engraved portion of the radio frequency module according to Embodiment.

FIG. 4 is a plan view illustrating the engraved portion 80 of the radio frequency module 1 according to the present embodiment. To be specific, FIG. 4 illustrates the top surface 92a of the resin member 92 as seen through a top surface portion of the metal shield layer 95. The top surface 10a of the power amplifier 10, the top surface 61Ta of the transmit filter 61T, and the top surface 62Ta of the transmit filter 62T are not covered with the resin member 92. In FIG. 4, among the circuit components illustrated in FIG. 2A, the components whose top surfaces are covered with the resin member 92 are indicated by the dashed lines.

The engraved portion 80 indicates the predetermined information about the radio frequency module 1. The predetermined information includes a model number, a manufacturing lot number, and/or a manufacturer's name of the radio frequency module 1. The engraved portion 80 includes characters, figures, or symbols. The characters are alphabets or numbers, but may be hiragana, katakana, kanji, or the like. In the example illustrated in FIG. 4, the engraved portion 80 includes four characters "1234".

The engraved portion 80 may include a two-dimensional code. The two-dimensional code is, for example, a QR code (registered trademark). The two-dimensional code represents, for example, a uniform resource locator (URL) indicating a web page that presents information about the radio frequency module 1.

The engraved portion 80 is placed on the top surface of one or more circuit components disposed on the principal surface 91a side. In the present embodiment, as illustrated in FIG. 4, the engraved portion 80 is placed only on the top surface 10a of the power amplifier 10. The engraved portion 80 is formed by grooves and/or recesses on the top surface 10a of the power amplifier 10. For example, the engraved portion 80 is a plurality of grooves formed along lines of characters. The engraved portion 80 is formed, for example, by irradiating the top surface 10a of the power amplifier 10 with laser light to remove part of a substrate of the power amplifier 10. It should be noted that the engraved portion 80 may be characters (convex portions) that are raised by removing portions other than the lines of the characters.

In the present embodiment, the metal shield layer 95 is provided so as to cover the engraved portion 80. A depth of the grooves and/or recesses forming the engraved portion 80 is greater than a thickness of the metal shield layer 95. The depth of the grooves and/or recesses of the engraved portion 80 is, for example, not less than 20 μm and not more than 30 μm. On the other hand, the thickness of the metal shield layer 95 is, for example, approximately 10 μm. The metal shield layer 95 is formed with a uniform film thickness along an uneven shape of the engraved portion 80. Thus, the surface (upper surface) of the metal shield layer 95 has unevenness similar to that of the engraved portion 80. This allows the engraved portion 80 to be visible from the outside even when the engraved portion 80 is covered with the metal shield layer 95.

By providing the engraved portion 80 on the top surface 10a of the power amplifier 10, a surface area of the top surface 10a is increased. This increases a contact area between the top surface 10a and the metal shield layer 95 in contact with the top surface 10a. By increasing the contact area, the heat generated in the power amplifier 10 is easily conducted to the metal shield layer 95, thereby enhancing the heat dissipation.

Further, the adhesion between the metal shield layer 95 and the power amplifier 10 is enhanced by an anchor effect due to the unevenness of the engraved portion 80. Thus, the peeling of the metal shield layer 95 is prevented, and the radio frequency module 1 with high reliability and durability can be obtained.

The power amplifier 10 provided with the engraved portion 80 is placed closer to an edge of the principal surface 91a than the center of the principal surface 91a of the module substrate 91 when viewed in plan. To be specific, the shortest distance between the power amplifier 10 and the edge of the principal surface 91a is shorter than the shortest distance between the power amplifier 10 and the center of the principal surface 91a. "The shortest distance between A and B" means a distance between a part of A closest to B and a part of B closest to A. The edge of the principal surface 91a is one point on a contour of the principal surface 91a when viewed in plan. The power amplifier 10 is placed closer to one of four corners (vertices) of the principal surface 91a than to the center of the principal surface 91a, for example.

By placing the engraved portion 80 at a position off the center of the radio frequency module 1 in this manner, the engraved portion 80 can be used to determine an orientation of the radio frequency module 1.

The engraved portion 80 may be provided on the top surface 61Ta of the transmit filter 61T or on the top surface 62Ta of the transmit filter 62T. The top surface 61Ta or 62Ta is a surface of a support substrate or a surface of a cover member of the SAW filter.

By not providing the engraved portion 80 on the resin member 92, the visibility of the engraved portion 80 can be enhanced. As illustrated in the part (a) of FIG. 5, the resin member 92 may contain a filler 92b.

Figure 5:
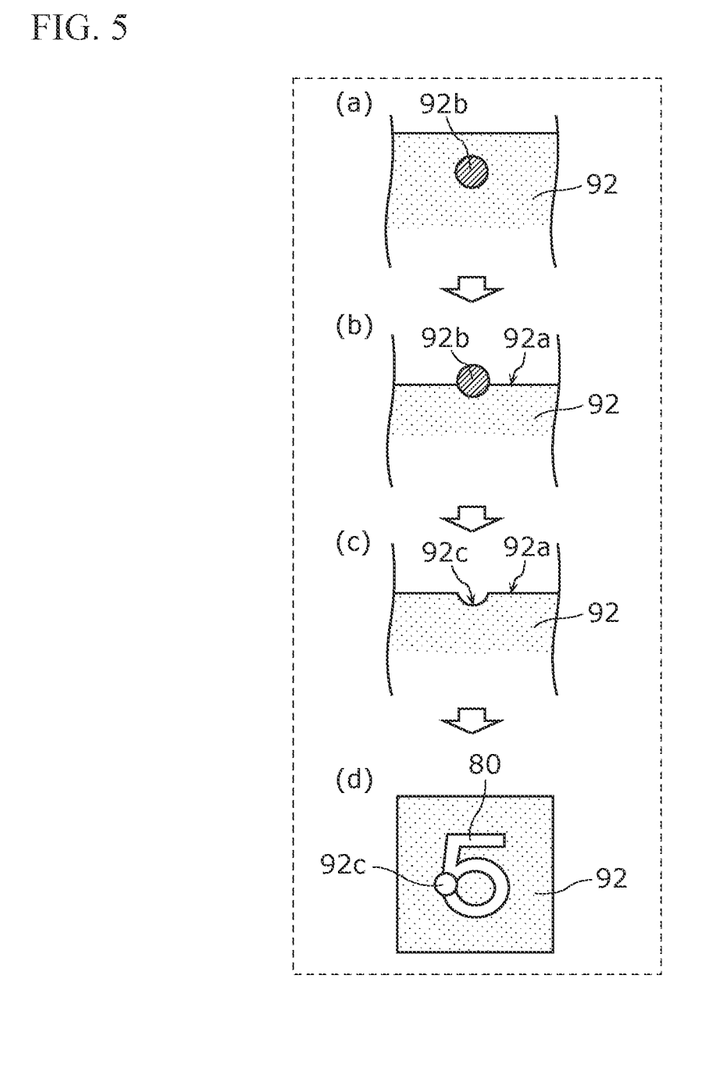
FIG. 5 is a diagram for explaining the visibility of the engraved portion formed on a top surface of a resin member containing a filler.

FIG. 5 is a diagram for explaining the visibility of the engraved portion 80 provided on the top surface 92a of the resin member 92 containing the filler 92b. The parts (a) to (c) of FIG. 5 are sectional views illustrating cross sections of the resin member 92, and the part (d) of FIG. 5 is a plan view illustrating the top surface 92a of the resin member 92.

The filler 92b is harder than a matrix material that is a main component of the resin member 92, and as illustrated in the part (b) of FIG. 5, the filler 92b may remain exposed without being polished on the top surface 92a of the resin member 92 after polishing. Since the exposed filler 92b easily falls off, a recess 92c is formed where the filler 92b was, as illustrated in the part (c) of FIG. 5. When the engraved portion 80 is formed so as to overlap the recess 92c, the character of the engraved portion 80 is partially deformed, resulting in poor visibility. For example, as illustrated in the part (d) of FIG. 5, when the recess 92c partially overlaps "5" indicated by the engraved portion 80, "5" is easily misidentified as "6".

In contrast, the top surface 10a of the power amplifier 10 is a surface of a semiconductor substrate made of Si, GaAs, or the like, so the engraved portion 80 can be formed with a stable depth by laser processing. The engraved portion 80 with high visibility is formed without the generation of the recess 92c due to the filler 92b.

4. Effects and Others

As described above, the radio frequency module 1 according to the present embodiment includes the module substrate 91 having the principal surface 91a, one or more circuit components disposed on the principal surface 91a side, the resin member 92 disposed on the principal surface 91a side and covering the side surface of the one or more circuit components, the metal shield layer 95 in contact with the top surface 92a of the resin member 92 and the top surface of the one or more circuit components, and the engraved portion 80 provided on the top surface of the one or more circuit components.

With this configuration, the contact area between the metal shield layer 95 and the circuit components increases, thereby facilitating the conduction of the heat generated in the circuit components to the metal shield layer 95. Thus, the radio frequency module 1 with excellent heat dissipation is obtained. Further, the peeling of the metal shield layer 95 is prevented by the anchor effect due to the unevenness of the engraved portion 80, thereby obtaining the radio frequency module 1 with high reliability and durability.

For example, the engraved portion 80 is provided only on the top surface of the one or more circuit components.

Thus, the engraved portion 80 is provided on the surfaces of the members made of the same material, thereby facilitating the formation of the grooves and/or the recesses having the uniform depth. Therefore, the visibility of the engraved portion 80 can be enhanced. When the grooves and/or the recesses are formed across the members made of different materials by the laser, an output of the laser needs to be changed and the number of steps of the laser processing is increased, shortening the time required for forming the engraved portion 80. When the engraved portion 80 is formed on the surfaces of the members made of the same material, an output of the laser does not need to be changed, and the number of the steps of the laser processing is reduced. Thus, the engraved portion 80 with high visibility can be formed in a short time.

For example, the one or more circuit components are placed closer to the edge of the principal surface 91a than the center of the principal surface 91a when the principal surface 91a is viewed in plan.

Thus, by placing the engraved portion 80 at the position off the center of the radio frequency module 1, the engraved portion 80 can be used to determine the orientation of the radio frequency module 1.

For example, the one or more circuit components include the power amplifier 10 that amplifies the transmitting signal. For example, the one or more circuit components may include a filter having a pass band in a radio frequency band.

This can enhance the heat dissipation of the components that easily generate heat.

For example, the resin member 92 contains the filler.

This can enhance the visibility of the engraved portion 80.

For example, the top surfaces of the one or more circuit components are flush with the top surface of the resin member 92.

This allows the metal shield layer 95 to smoothly cover the top surface 92a of the resin member 92 and the top surfaces of the circuit components without steps. By reducing the unevenness, the metal shield layer 95 with the uniform film thickness and high shielding effect is formed.

For example, the engraved portion 80 includes the characters, the figures, the symbols, or the two-dimensional code.

This allows the predetermined information to be easily notified to a person by the characters or the like. Further, by using the two-dimensional code, more information can be notified to a person.

The communication device 5 according to the present embodiment includes the RFIC 3 that processes radio frequency signals to be transmitted and received by the antenna 2, and the radio frequency module 1 that transmits the radio frequency signals between the antenna 2 and the RFIC 3.

Thus, the communication device 5 including the radio frequency module 1 with excellent heat dissipation can be obtained.

5. Modifications

Here, Modifications of Embodiment will be described. In the following description, differences from Embodiment will be mainly described, and description of common points will be omitted or simplified.

5-1. Modification 1

Figure 6:
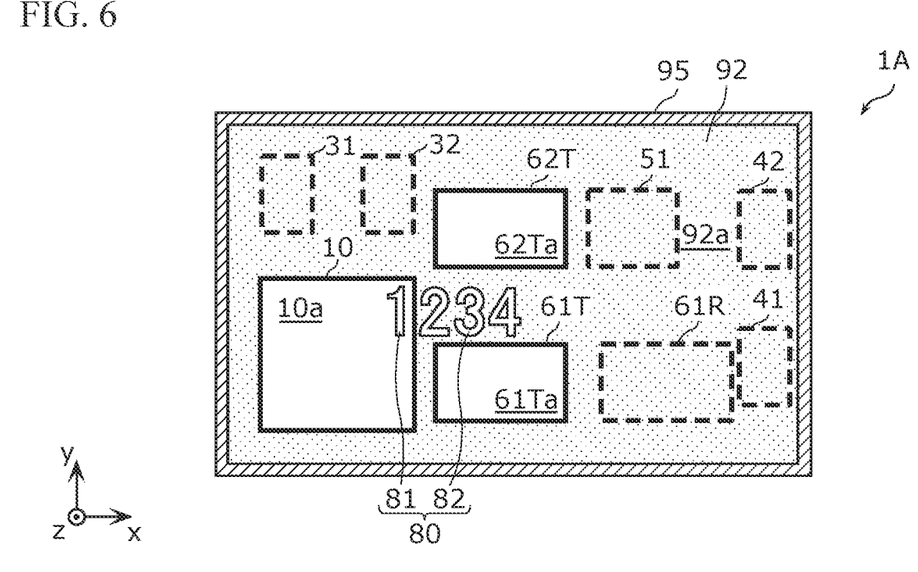
FIG. 6 is a plan view illustrating an arrangement of the engraved portion of a radio frequency module according to Modification 1 of Embodiment.

In Embodiment, an example has been described in which the entire engraved portion 80 is provided on the top surface 10a of the power amplifier 10, but a location of the engraved portion 80 is not limited thereto. As illustrated in FIG. 6, in Modification 1, part of the engraved portion 80 is provided on the top surface 92a of the resin member 92.

FIG. 6 is a plan view illustrating the engraved portion 80 of a radio frequency module 1A according to Modification 1 of Embodiment. As illustrated in FIG. 6, the engraved portion 80 includes a first portion 81 provided on the top surface 10a of the power amplifier 10 and a second portion 82 provided on the top surface 92a of the resin member 92.

The first portion 81 includes one character "1". The second portion 82 includes three characters "234". Combining the first portion 81 and the second portion 82 represents one piece of information (e.g., a model number).

The number of characters included in the first portion 81 and the number of characters included in the second portion 82 need not be the same or may be different. Each of the first portion 81 and the second portion 82 includes one or more characters. Alternatively, at least one of the first portion 81 and the second portion 82 may include a figure, a symbol, or a two-dimensional code instead of the character.

As described above, in the radio frequency module 1A according to the present modification, the engraved portion 80 is provided on the top surface of one or more circuit components and on the top surface 92a of the resin member 92.

This can enhance the layout flexibility of the engraved portion 80. Even when a circuit component has a small shape when viewed in plan, the heat dissipation can be enhanced by providing part of the engraved portion 80.

The second portion 82 of the engraved portion 80, which is provided on the top surface 92a of the resin member 92, may be in contact with a circuit component whose top surface is covered with the resin member 92. That is, the bottoms of the grooves and/or recesses of the second portion 82 may be the top surface of the circuit component. For example, the resin member 92 may be removed by laser processing to form the engraved portion 80 so as to expose the top surface of the circuit component.

In this case, the metal shield layer 95 is in contact with the top surface of the circuit component via the engraved portion 80. For example, the circuit component with which the engraved portion 80 is in contact is the matching circuit 31, 32, 41, or 42. A metal layer connected to the ground potential may be provided on a top surface and side surfaces of this circuit component. This strengthens the grounding to the metal shield layer 95.

5-2. Modification 2

Figure 7:
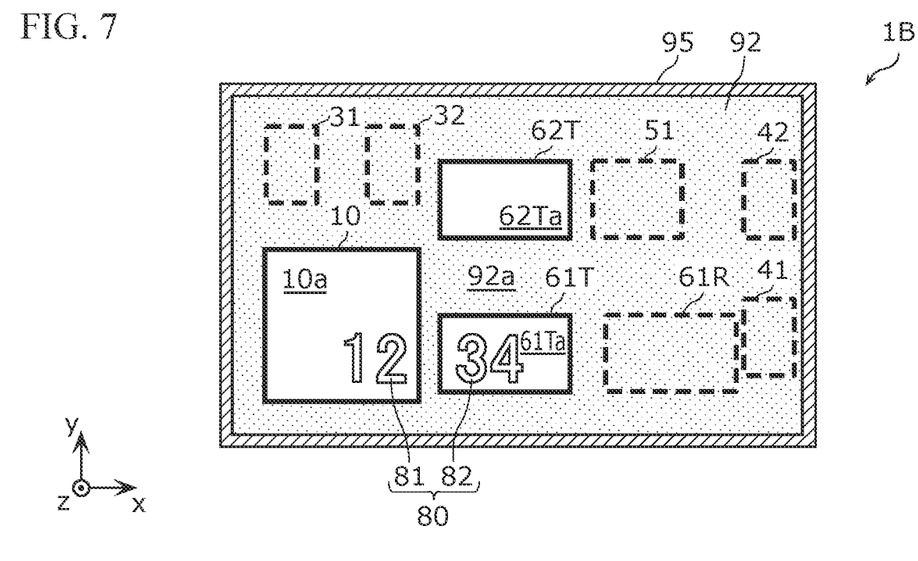
FIG. 7 is a plan view illustrating an arrangement of the engraved portion of a radio frequency module according to Modification 2 of Embodiment.

In Embodiment, an example has been described in which the entire engraved portion 80 is provided on the top surface of one circuit component (the power amplifier 10), but a location of the engraved portion 80 is not limited thereto. As illustrated in FIG. 7, in Modification 2, the engraved portion 80 is provided across the top surfaces of two or more circuit components.

FIG. 7 is a plan view illustrating the engraved portion 80 of a radio frequency module 1B according to Modification 2 of Embodiment. As illustrated in FIG. 7, the engraved portion 80 includes the first portion 81 provided on the top surface 10a of the power amplifier 10 and the second portion 82 provided on the top surface 61Ta of the transmit filter 61T.

As described above, in the radio frequency module 1B according to the present modification, the engraved portion 80 is provided on the top surfaces of the two or more circuit components.

Thus, since the engraved portion 80 is not provided on the resin member 92, the visibility of the engraved portion 80 can be enhanced without being affected by the filler 92b. In addition, even when the entire engraved portion 80 cannot be formed on one circuit component, the engraved portion 80 can be divided on two or more circuit components, and thus the heat dissipation of each of the two or more circuit components can be enhanced.

Others

Although the radio frequency module and the communication device according to the present disclosure have been described based on Embodiment and Modifications thereof described above, the present disclosure is not limited to Embodiment described above.

For example, the thickness of the metal shield layer 95 may be thicker than the depth of the engraved portion 80. For example, the metal shield layer 95 does not have to cover at least part of the engraved portion 80.

For example, at least one of the power amplifier 10 and the transmit filters 61T and 62T may be covered with the resin member 92. That is, a type of circuit component in contact with the metal shield layer 95 is not limited.

For example, an allocation of the plurality of circuit components included in the radio frequency module to the principal surfaces 91a and 91b of the module substrate 91 is not limited. For example, the PA control circuit 11 may be placed on the principal surface 91a side, and the transmit filter 61T or 62T may be placed on the principal surface 91b side. Alternatively, all the circuit components may be disposed on the principal surface 91a side and no circuit components may be disposed on the principal surface 91b side.

For example, the radio frequency module does not have to include the resin member 93 that covers the principal surface 91b. For example, the external connection terminals 150 may be bump electrodes or planar electrodes.

For example, the top surface of the circuit component that is not covered with the resin member 92 does not necessarily have to be flush with the top surface 92a of the resin member 92. For example, the top surface 10a of the power amplifier 10 and the top surface 92a of the resin member 92 may be different in level.

In addition, the present disclosure includes embodiments obtained by applying various modifications conceived by those skilled in the art to Embodiment and Modifications and embodiments implemented by appropriately combining constituent elements and functions in Embodiment and Modifications without departing from the gist of the present disclosure.

The present disclosure can be widely used in communication devices or the like such as mobile phones by being employed in a radio frequency module disposed in a multiband front end.

1, 1A, 1B RADIO FREQUENCY MODULE
2 ANTENNA
3 RFIC
4 BBIC
5 COMMUNICATION DEVICE
10 POWER AMPLIFIER
10a, 61Ta, 62Ta, 92a TOP SURFACE
11 PA CONTROL CIRCUIT
20 LOW NOISE AMPLIFIER
31, 32, 41, 42 MATCHING CIRCUIT
51, 52, 53 SWITCH
61, 62 DUPLEXER
61R, 62R RECEIVE FILTER
61T, 62T TRANSMIT FILTER
70 SEMICONDUCTOR INTEGRATED CIRCUIT
80 ENGRAVED PORTION
81 FIRST PORTION
82 SECOND PORTION
91 MODULE SUBSTRATE
91a, 91b PRINCIPAL SURFACE
92, 93 RESIN MEMBER
92b FILLER
92c RECESS
95 METAL SHIELD LAYER
100 ANTENNA CONNECTION TERMINAL
110 RADIO FREQUENCY INPUT TERMINAL
111 CONTROL INPUT TERMINAL
120 RADIO FREQUENCY OUTPUT TERMINAL
150 EXTERNAL CONNECTION TERMINAL

The invention claimed is:

1. A radio frequency module comprising:
a module substrate having a principal surface;
one or more circuit components disposed on the principal surface;
a resin member placed on the principal surface and covering a side surface of the one or more circuit components;
a metal layer in contact with a top surface of the resin member and top surfaces of the one or more circuit components; and
an engraved portion provided on the top surfaces of the one or more circuit components.

2. The radio frequency module according to claim 1, wherein the engraved portion is provided only on the top surfaces of the one or more circuit components.

3. The radio frequency module according to claim 1, wherein the engraved portion is provided on the top surfaces of the one or more circuit components and the top surface of the resin member.

4. The radio frequency module according to claim 1, wherein the one or more circuit components comprise a plurality of circuit components, and
the engraved portion is provided on top surfaces of all of the plurality of circuit components.

5. The radio frequency module according to claim 1, wherein the one or more circuit components are placed closer to an edge of the principal surface than to a center of the principal surface when the principal surface is viewed in plan.

6. The radio frequency module according to claim 1, wherein the one or more circuit components include a filter having a pass band in a radio frequency band.

7. The radio frequency module according to claim 1, wherein the one or more circuit components include a power amplifier configured to amplify a transmitting signal.

8. The radio frequency module according to claim 1, wherein the resin member contains a filler.

9. The radio frequency module according to claim 1, wherein the top surfaces of the one or more circuit components are flush with the top surface of the resin member.

10. The radio frequency module according to claim 1, wherein the engraved portion includes a character, a figure, a symbol, or a two-dimensional code.

11. A communication device comprising:
an RF signal processing circuit configured to process radio frequency signals transmitted and received by an antenna; and
the radio frequency module according to claim 1, configured to transmit the radio frequency signals between the antenna and the RF signal processing circuit.

12. The radio frequency module according to claim 2, wherein the one or more circuit components comprise a plurality of circuit components, and
the engraved portion is provided on top surfaces of all of the plurality of circuit components.

13. The radio frequency module according to claim 3,
wherein the one or more circuit components comprise a plurality of circuit components, and
the engraved portion is provided on top surfaces of all of the plurality of circuit components.

14. The radio frequency module according to claim 2,
wherein the one or more circuit components are placed closer to an edge of the principal surface than to a center of the principal surface when the principal surface is viewed in plan.

15. The radio frequency module according to claim 3,
wherein the one or more circuit components are placed closer to an edge of the principal surface than to a center of the principal surface when the principal surface is viewed in plan.

16. The radio frequency module according to claim 4,
wherein the one or more circuit components are placed closer to an edge of the principal surface than to a center of the principal surface when the principal surface is viewed in plan.

17. The radio frequency module according to claim 2,
wherein the one or more circuit components include a filter having a pass band in a radio frequency band.

18. The radio frequency module according to claim 3,
wherein the one or more circuit components include a filter having a pass band in a radio frequency band.

19. The radio frequency module according to claim 4,
wherein the one or more circuit components include a filter having a pass band in a radio frequency band.

20. The radio frequency module according to claim 5,
wherein the one or more circuit components include a filter having a pass band in a radio frequency band.

\* \* \* \* \*